(12) United States Patent
Cirlig

(10) Patent No.: US 12,333,008 B2
(45) Date of Patent: Jun. 17, 2025

(54) EMULATION-BASED MALWARE DETECTION

(71) Applicant: CrowdStrike, Inc., Sunnyvale, CA (US)

(72) Inventor: Gabriel Cirlig, London (GB)

(73) Assignee: CrowdStrike, Inc., Sunnyvale, CA (US)

( * ) Notice: Subject to any disclaimer, the term of this patent is extended or adjusted under 35 U.S.C. 154(b) by 295 days.

(21) Appl. No.: 17/899,992

(22) Filed: Aug. 31, 2022

(65) Prior Publication Data

US 2024/0070275 A1    Feb. 29, 2024

(51) Int. Cl.
*G06F 21/56* (2013.01)
*G06N 5/022* (2023.01)

(52) U.S. Cl.
CPC .......... *G06F 21/566* (2013.01); *G06N 5/022* (2013.01); *G06F 2221/033* (2013.01)

(58) Field of Classification Search
CPC .. G06F 21/566; G06F 21/53; G06F 2221/033; G06N 5/022
See application file for complete search history.

(56) References Cited

U.S. PATENT DOCUMENTS

| | | | | |
|---|---|---|---|---|
| 8,290,763 B1* | 10/2012 | Zhang | | G06F 21/566 703/26 |
| 8,510,838 B1* | 8/2013 | Sun | | G06F 21/566 713/181 |
| 8,555,386 B1* | 10/2013 | Belov | | G06F 21/566 726/22 |
| 8,661,547 B1* | 2/2014 | Kononov | | G06F 16/122 713/176 |
| 9,491,142 B2* | 11/2016 | Xie | | G06F 21/53 |
| 9,910,988 B1* | 3/2018 | Vincent | | G06F 21/566 |
| 10,192,052 B1* | 1/2019 | Singh | | G06F 21/566 |
| 10,452,817 B1* | 10/2019 | Mingyan | | G06F 21/53 |
| 10,565,376 B1* | 2/2020 | Jung | | G06F 21/566 |
| 10,636,387 B2* | 4/2020 | Imms | | G06F 40/109 |
| 2009/0089878 A1* | 4/2009 | Monastyrsky | | G06F 21/566 726/22 |
| 2010/0180344 A1* | 7/2010 | Malyshev | | G06F 21/566 726/23 |

(Continued)

OTHER PUBLICATIONS

Caleb Fenton, et al.; website: https://github.com/CalebFenton/simplify/blob/master/README.md (10 pages), Aug. 31, 2022.

(Continued)

*Primary Examiner* — Richard G Keehn
(74) *Attorney, Agent, or Firm* — Womble Bond Dickinson (US) LLP

(57) ABSTRACT

An executable program compiled for a first execution environment is obtained. The executable program is processed by an emulation function of a second execution environment to create an execution profile for the executable program. The emulation function of the second execution environment is configured to emulate an execution of the executable program and to replace an application programming interface (API) function call within the executable program with a call to an emulated API function call within the second execution environment. A malware classification is determined for the executable program based on the execution profile.

17 Claims, 7 Drawing Sheets

(56) References Cited

U.S. PATENT DOCUMENTS

| | | | | |
|---|---|---|---|---|
| 2010/0192222 | A1* | 7/2010 | Stokes | G06F 21/563 |
| | | | | 703/23 |
| 2011/0047618 | A1* | 2/2011 | Evans | G06F 21/566 |
| | | | | 726/23 |
| 2014/0096250 | A1* | 4/2014 | Belov | G06F 21/566 |
| | | | | 726/23 |
| 2016/0048683 | A1* | 2/2016 | Sanders | G06F 21/566 |
| | | | | 726/23 |
| 2017/0277891 | A1* | 9/2017 | Keppler | G06F 21/566 |
| 2018/0025157 | A1* | 1/2018 | Titonis | G06F 21/566 |
| | | | | 726/22 |
| 2018/0046799 | A1* | 2/2018 | Kohavi | G06F 21/53 |
| 2018/0068115 | A1* | 3/2018 | Golovkin | G06F 21/53 |
| 2019/0243968 | A1* | 8/2019 | Gordeychik | G06F 21/53 |
| 2021/0097177 | A1* | 4/2021 | Chistyakov | G06F 21/56 |
| 2021/0374241 | A1* | 12/2021 | Parikh | G06F 21/53 |
| 2021/0397708 | A1* | 12/2021 | Pintiysky | G06F 21/566 |
| 2022/0138314 | A1* | 5/2022 | Raber | G06F 21/53 |
| | | | | 726/23 |
| 2023/0325501 | A1* | 10/2023 | Chhetri | G06F 21/53 |
| | | | | 726/24 |

OTHER PUBLICATIONS

JEB Decompiler; website: https://www.pnfsoftware.com/jeb/android (7 pages), Aug. 31, 2022.

\* cited by examiner

EMULATION-BASED MALWARE DETECTION

TECHNICAL FIELD

Aspects of the present disclosure relate to detecting malicious executables, and more particularly, to detecting malicious executables through execution emulation.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or -removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
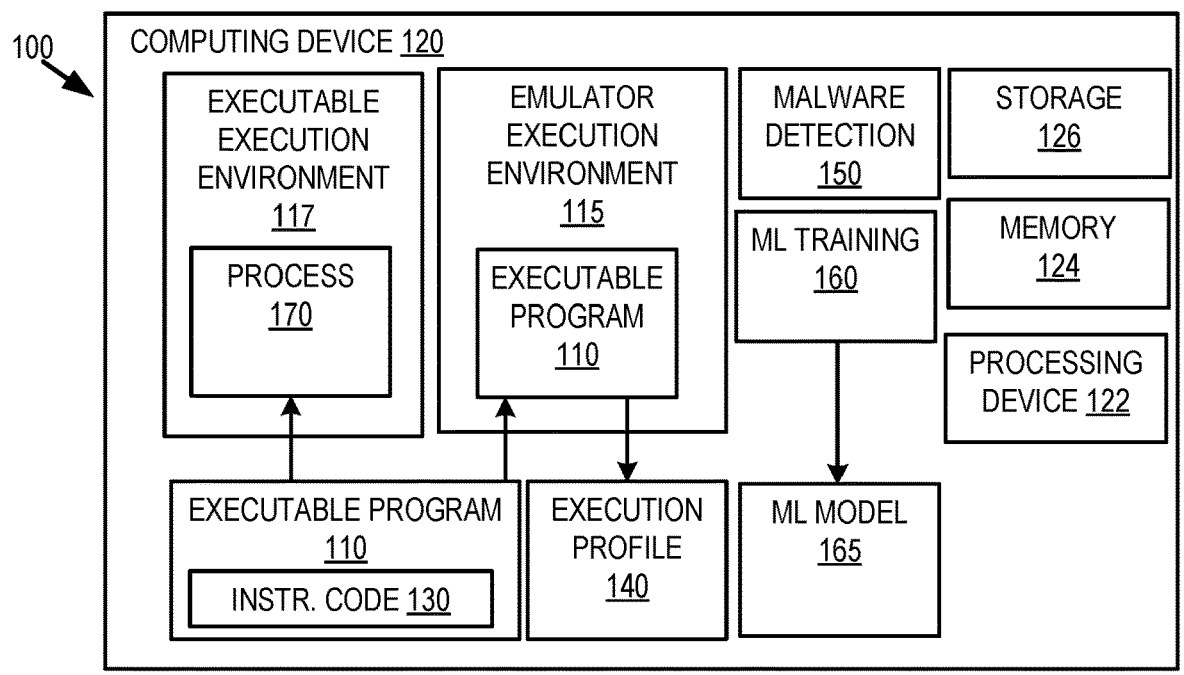
FIG. 1 is a block diagram that illustrates an example system for emulating executable programs and/or detecting malware, according to some embodiments of the present disclosure.

Modern computer systems are subject to a large number of potential malware attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware. These scanning programs may review programs and/or executables that exist on the computer's storage medium (e.g., a hard disk drive (HDD)) prior to execution of the file. However, authors and distributors of malware have taken countermeasures to avoid these scanning programs. In some cases, the malware is obfuscated to conceal the contents of the file. Obfuscation may include varying the contents of the file to misdirect, confuse, or otherwise conceal the true purpose and/or function of the code. For example, obfuscation may include inserting inoperable code within the executable instructions, compressing/encrypting the operating instructions, rearranging the instruction codes, and/or other techniques. These techniques can make it difficult to identify malware in at-rest files.

In some cases, execution of suspected malware may be utilized to help in detecting potentially malicious code. While executing, code that is otherwise obfuscated may be de-obfuscated for execution. While this may make detection of the malicious code easier, execution-based detection may bring additional problems. Since the code being executed is potentially malicious, it runs the risk of infecting the very machine attempting to detect it. In some cases, virtual machines (VMs) may be constructed to execute the malware in a more controlled environment. Nonetheless, it may be possible for malware to execute on a VM so as attack/alter the system outside the VM (sometimes referred to as a VM escape). To avoid this potential result, machines configured to detect malware may be hardened, with potentially malicious code being executed within specialized environments intended to minimize attack surfaces. Such environments may be completely disposable such that the entire machine is deleted/reinstalled after use to avoid any potential contamination. At least in part because of these additional security measures, the types of detection that rely on execution may be more resource intensive, requiring additional equipment, intrusive and/or potentially performance-degrading monitoring infrastructure, and/or increased processing resources (e.g., by a processing device of the detecting system). While potentially safer, this method of detection may be outside the capabilities of many small businesses and users. For example, users of a mobile device may be unable to perform detection of malware on their own mobile devices due to the specialized resources utilized for safe malware detection. This may place users in a position of having to send the potential malware out to a specialized service for detection, which may cause a delay in detect and may potentially require sharing confidential information.

The present disclosure addresses the above-noted and other deficiencies by providing an emulator capable of scanning an executable program (e.g., a data file containing computer instructions to be executed by a processing device) suspected of malware without directly executing the executable program. The emulator may simulate execution of the suspected executable program and may provide emulated versions of application programming interfaces (APIs) that can be used to simulate calls to known APIs that are made within the suspected executable program. The emulator may allow for the emulation of the computer instructions within the suspected executable program that deobfuscate the code, which may allow for the deobfuscated instructions to be extracted for analysis. Because the instructions of the suspected executable program are emulated rather than executed, the risk of the suspected executable program infecting the detecting/scanning machine are reduced and/or eliminated. Moreover, embodiments of the present disclosure may allow for discovery of suspected malware utilizing fewer processing resources and may not require the specialized environments utilized by some malware detection environments. As a result, some embodiments of the present disclosure may be capable of running on mobile devices, which expand the audiences of users that may detect malware safely. Stated another way, embodiments of the present disclosure may improve the operation of a computing device such that the computing device (e.g., a mobile device or a computing device of a small business owner) can perform technological operations (e.g., detecting malware) that were not previously possible or were prohibitively difficult.

The embodiments described herein provide improvements over some malware detection solutions which rely on specialized and/or hardened environments. In sharp contrast, the emulator environment described herein may be capable of determining features (e.g., characteristics of data associated with a suspected executable program) that are indicative of an executable program that contains malware, without actually executing the code associated with the executable program. These features may be identified, in some cases, regardless of attempts by an author of the malware to change its data signature. In this way, embodiments according to the present disclosure may provide an improved capability of detecting malware and may increase the security of a computer system. In addition, embodiments of the present disclosure may be capable of detecting malware utilizing fewer resources while not exposing the detecting system to attack by the malware.

FIG. 1 is a block diagram that illustrates an example system 100 for emulating executable programs and/or detecting malware, according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles of the computing device 120.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Though illustrated as a separate element, in some embodiments, the storage device 126 may be mart of memory 124.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may have one or more executable programs 110. In some embodiments, the executable programs 110 contain one or more instruction codes 130 configured to be executed by the computing device 120 (e.g., by the processing device 122). In some embodiments, the executable program 110 may be loaded into an executable execution environment 117 of the computing device to be executed as a process 170. For example, the executable execution environment 117 may be an operating system of the computing device 120 and/or a virtual machine (VM) executing on the computing device 120. As an example, the executable program 110 may be an application programmed using the JAVA™ programming language. The executable program 110 may be compiled (e.g., by a JAVA compiler) to include JAVA-based instructions (e.g., JAVA bytecode configured to be executed in a JAVA VM (JVM)). In some embodiments, the executable program 110 may include JAVA-based instructions written for an ANDROID™-based computing device 129. For example, the JAVA bytecode of the executable program 110 may have been programmed and/or compiled for an executable execution environment 117 that includes a Dalvik VM and/or an Android Runtime (ART) environment.

The computing device 120 may execute an emulator execution environment 115 (also referred to herein as an "emulator"). The emulator execution environment 115 may be configured to load the executable program 110 into the emulator execution environment 115 (e.g., into a memory space, such as that associated with memory 124 of the emulator execution environment 115) for emulation. As used herein, emulation of an executable program 110 containing instruction codes 130 is intended to be differentiated from execution of the same executable program 110 containing instruction codes 130.

In the case of execution, the executable program 110 is loaded into the executable execution environment 117 (e.g., as process 170) and the instruction codes 130 of the executable program 110 are provided to the processing device 122 for execution by the processing device 122. Stated another way, the executable execution environment 117 and/or processing device 122 executes (directly or indirectly) the instruction codes 130 of the executable program 110. In a case of a Java-based VM or other VM, the VM may provide, as part of the execution of the executable program 110, an interpreter that interprets bytecode as the instruction codes 130 of the executable program 110 and submits one or more instructions to the processing device 122 that correspond to the bytecode.

In the case of emulation, the executable program 110 is loaded into the emulator execution environment 115 and the instruction codes 130 of the executable program 110 are examined by the emulator execution environment 115 to determine effects of the hypothetical execution of the executable program 110, without submitting the instruction codes 130 of the executable program 110 to the processing device 122. For example, the emulator execution environment 115 may maintain one or more registers or other state-based data within memory 124 that are manipulated as the emulator execution environment 115 processes and/or emulates the instruction codes 130 of the executable program 110. For example, instruction codes 130 that are intended to modify registers of the processing device 122 during execution of the instruction codes 130 may instead modify registers (as data values) in memory 124 during emulation of the instruction codes 130.

In some embodiments, the emulator execution environment 115 may be configured differently from the executable execution environment 117. For example, in some embodiments, the executable execution environment 117 may be a JAVA-based environment, such as a JAVA VM, ART, or a Dalvik VM and the executable program 110 may also be JAVA-based (e.g., compiled for a JAVA-based environment). In some embodiments, the emulator execution environment 115 may be non-JAVA-based. For example, in some embodiments, the emulator execution environment 115 may be based on PYTHON™. PYTHON is an interpreted, high-level programming language whose instructions may be dynamically interpreted at run-time. The use of a PYTHON-based emulator execution environment 115 for the emulation of a JAVA-based executable program 110 may provide additional security, as the PYTHON-based emulator execution environment 115 may not need to, and/or may not be capable of, natively executing the instruction codes 130 of the executable program 110.

Figure 2A:
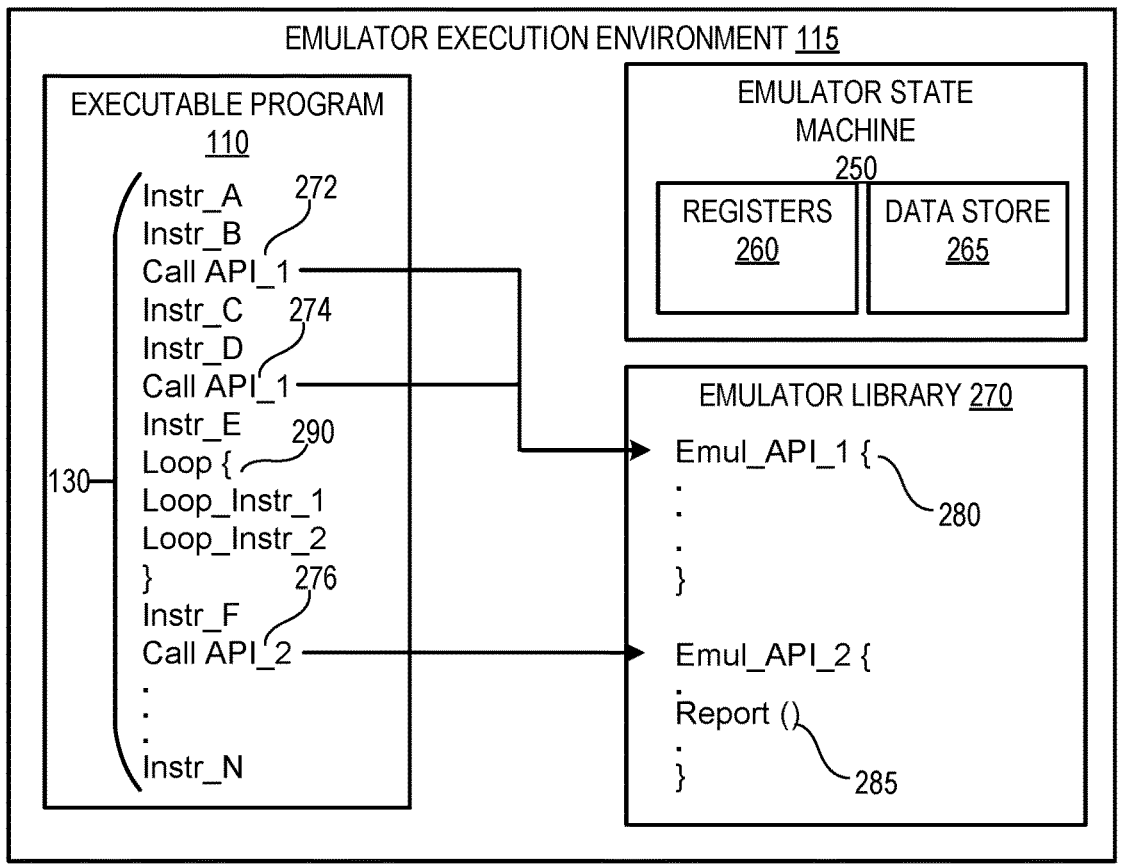
FIG. 2A is a block diagram illustrating an example of operation of an emulator execution environment, according to some embodiments of the present disclosure.

FIG. 2A is a block diagram illustrating an example of operation of an emulator execution environment 115, according to some embodiments of the present disclosure. FIG. 2A provides additional detail of the operation of the emulator execution environment 115 illustrated in FIG. 1. A description of elements of FIG. 2A that have been previously described will be omitted for brevity.

Referring to FIGS. 1 and 2A, as part of emulating the executable program 110, the emulator execution environment 115 may load and/or examine the instruction codes 130 of the executable program 110 (e.g., into memory 124 of the computing device 120 of FIG. 1). The instruction codes 130 are intended to be a schematic example of instruction codes 130 and are not intended to be a representation of actual instruction codes 130. Moreover, the flow of the instruction codes 130 is merely provided as an example and is not intended to limit the embodiments of the present disclosure.

As illustrated in FIG. 2A, the instruction codes 130 may include a plurality of instruction codes 130 arranged in a sequence. Though illustrated using pseudocode in FIG. 2A, the instruction codes 130 may be stored in the executable program 110 and analyzed by the emulator execution environment 115 in numeric form (e.g., as binary data). For example, predefined numeric codes may be associated with particular executable instructions.

During execution of the executable program 110 (e.g., by processing device 122 by way of the executable execution environment 117 of FIG. 1), the instruction codes 130 may be arranged (e.g., in memory 124 of FIG. 1) to be serially executed in a particular order determined by the arrangement of the instruction codes 130 within the executable program 110.

Rather than executing the individual instruction codes 130, the emulator execution environment 115 may maintain an emulator state machine 250. The emulator state machine 250 may include, as non-limiting examples, registers 260 and a data store 265. The emulator execution environment 115 may process each of the instruction codes 130 in a similar order of execution as would be used if the instruction codes 130 were executed. As part of processing the instruction codes 130, the emulator execution environment 115 may analyze an instruction represented by the instruction code 130 and perform any modifications to the emulator state machine 250 that may be indicated by the instruction code 130. For example, if the instruction code 130 would modify a register of a processing device (such as processing device 122 of FIG. 1) when being executed, the emulator execution environment 115 may modify a register of the registers 260 of the emulator state machine 250 instead. As another example, if the instruction code 130 would read a register of a processing device (such as processing device 122 of FIG. 1) when being executed, the emulator execution environment 115 may return a value associated a register of the registers 260 of the emulator state machine 250 instead. As yet another example, if the instruction code 130 would modify memory of the computing device (such as memory 124 of computing device 120 of FIG. 1), the emulator execution environment 115 may modify the data store 265 of the emulator state machine 250 instead.

In some embodiments, an underlying execution format of the emulator execution environment 115 may be different from that of the executable execution format for which the executable program 110 was compiled. For example, the executable program 110 may be compiled for a first execution environment, such as a JAVA-based execution environment, and the emulator execution environment 115 may be a different execution environment, such as a PYTHON-based environment. The differences in the execution environments may provide challenges for the emulator execution environment 115.

For example, the executable program 110 may include calls to APIs that would otherwise be provided by the executable execution environment 117 (see FIG. 1). For example, if the executable execution environment 117 is JAVA-based, the executable execution environment 117 may provide libraries that export APIs that may be used and/or called by the executable program 110 during execution. Because the executable program 110 is being emulated in an emulator execution environment 115 that is different from the executable execution environment 117 rather than being executed, the APIs of the executable execution environment 117 may not be available. In some embodiments, an emulator library 270 may be provided that allows emulation of APIs that would otherwise be available in the executable execution environment 117. For example, the emulator library 270 may include one or more emulated APIs 280 that correspond to APIs that are exported and/or available within the executable execution environment 117.

Referring to FIG. 2A, the emulator execution environment 115 may detect a call 272 within the instruction codes 130 to a first API. As part of emulating the operation of the executable program 110, the emulator execution environment 115 may replace the call to the API ("API_1" in the example of FIG. 2A) with a call to an emulated API 280 ("Emul_API_1" in the example of FIG. 2A) that is associated with the emulator library 270. In some embodiments, the emulator execution environment 115 may maintain a mapping (e.g., a lookup table) between known APIs and emulated APIs 280 available in the emulator library 270. The emulated API 280 of the emulator library 270 may differ from the API that would typically be provided by the executable execution environment 117 in a number of ways. For example, the emulated API 280 of the emulator library 270 may perform only a subset of the operations that would typically be performed by the executable execution environment 117. For example, the emulated API 280 may manipulate the emulator state machine 250 so as to modify the registers 260 and/or data store 265 of the emulator state machine 250 in a way that replicates the expected behavior of the original API, but may not do additional operations that would typically be performed within the executable execution environment 117. As an example, the call 272 to the API of the executable execution environment 117 within the instruction codes 130 may be an API that would typically generate a string in the executable execution environment 117. In the emulated API 280, a string may be generated as in the original API, but the string may be generated using the instructions of the emulator execution environment 115 and placed in the emulator state machine 250. In addition, the full set of instructions that may be present in the API of the executable execution environment 117 may not be emulated. This may increase the performance of the emulator execution environment 115 as well as reducing an attack surface for malware.

As another example, an API for the executable execution environment 117 may execute instantiation and/or initialization code as part of executing. In some embodiments, the emulated API 280 of the emulator library 270 may do this for the first call 272 of the instruction codes 130 but may not do this for subsequent calls 274 of the emulated API 280. For example, as illustrated in FIG. 2A, a first call 272 to the emulated API 280 may result in one or more elements of instructions of the emulated API 280 being executed to perform initialization code to modify the emulator state machine 250 to initialize a state related to the emulated API 280. However, for a subsequent call 274 to the emulated API 280, the initialization code may be skipped. This may increase the performance of the emulator execution environment 115 at the expense of exact emulation. However, as one goal of the emulator execution environment 115 is to detect malware, an exact emulation may not be necessary. Instead, the emulation of the instruction codes 130 may only need to be accurate enough to detect whether the executable program 110 is malware.

As illustrated in FIG. 2A, the emulator library 270 may include a plurality of emulated APIs 280, each of the plurality of emulated APIs 280 configured to replace one or more APIs that would be provided as part of the executable execution environment 117 were the executable program 110 to be executed. Though the emulated APIs 280 may be configured to perform fewer operations than their counterpart APIs in the executable execution environment 117, the emulated APIs 280 may, in some embodiments, execute additional code as part of their emulation. For example, the emulated APIs 280 may include a reporting operation 285 that may allow for additional operations and/or data to be processed in response to a particular emulated API 280 being called. For example, the emulator execution environment 115 may detect a call 276 to an additional emulated API 280 ("Emul_API_2" in FIG. 2A) that contains a report operation 285. The report operation 285 may provide additional detail regarding the operation of the emulated API 280. As an example, if the emulated API 280 corresponds to an API for the generation of a string, the report operation 285 of the emulated API 280 may allow for data about the string that is requested to be exported from the emulator execution environment 115. As will be discussed further herein, this may aid in detecting whether the executable program 110 is or contains malware. For example, the report operation 285 may be used to generate an execution profile 140 (see FIG. 1) of the executable program 110 that will be described further herein.

In some embodiments, the instruction codes 130 may include one or more jump statements 290 (illustrated as a "Loop" instruction in the example of FIG. 2A). A jump statement 290 may be a statement within the instruction codes 130 that would typically move an execution instruction pointer to a different location within the instruction codes 130 when the executable program 110 is being executed (e.g., by the executable execution environment 117 of FIG. 1). In some embodiments, jump statements 290 may be used within malware to obfuscate the true function of the executable program 110. For example, a size or a content of the instructions codes 130 may be hidden or otherwise obfuscated by utilizing jump statements 290 to mask the extent of the code being executed. For example, a loop that executes two instructions fifty times may ultimately execute one hundred instructions. However, the jump statement 290 of the loop may allow the total number of instructions to be masked to much less than one hundred instructions within the instruction codes 130. As another example, jump statements 290 may be used to alter the order of execution of the instruction codes 130 in a way that is masked by the order of the instruction codes 130 within the executable program 110. The use of jump statements 290 may make it difficult to statically analyze an executable program 110 at rest (e.g., in storage 126 of FIG. 1) because it may be difficult to determine the total number of instructions that will be executed, or the order of their execution, when the executable program 110 is ultimately loaded into memory and executed by the executable execution environment 117.

The emulator execution environment 115 may appropriately follow the jump statement 290 in its emulation of the instruction codes 130. Stated another way, the emulator execution environment 115 may detect the presence of the jump statement 290 within the instruction codes 130 and appropriately emulate the instruction codes serially in accordance with the jump statement 290. Thus, for a jump statement 290 implementing a loop that contains two instructions, with the loop to be repeated fifty times, the emulator execution environment 115 may serially process the instructions of the loop fifty times and may modify the emulator state machine 250 for each of the instructions.

Thus, without actually executing the instruction codes 130, the emulator execution environment 115 may nonetheless detect a state that may be present after processing the jump statements 290 in a way that emulates the execution of the executable program 110.

Figure 2B:
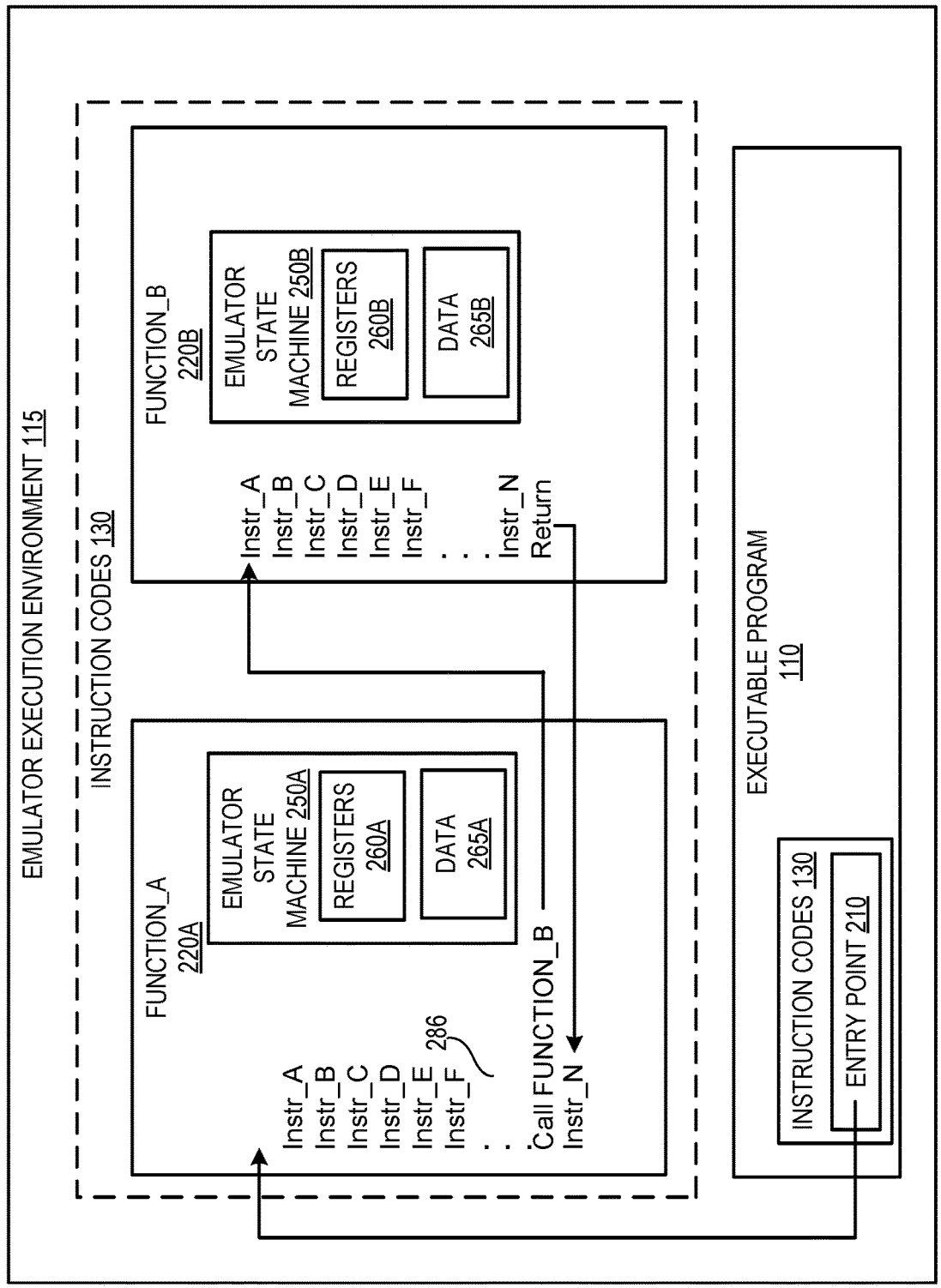
FIG. 2B is a block diagram of additional details for the emulation of the emulator execution environment of FIG. 2A, according to some embodiments of the present disclosure.

FIG. 2B is a block diagram of additional details for the emulation of the emulator execution environment 115 of FIG. 2A, according to some embodiments of the present disclosure. FIG. 2B illustrates an example of how the emulator execution environment 115 may process the flow of the instruction codes 130 of the executable program 110.

Referring to FIG. 2B, as part of emulating the executable program 110, the emulator execution environment 115 may analyze the executable program 110 to detect an entry point 210 within the instruction codes 130 of the executable program 110. The entry point 210 may identify and/or designate a portion of the instruction codes 130 of the executable program 110 at which the execution of the executable program 110 would begin when executing. The emulator execution environment 115 may begin its emulation of the executable program 110 by analyzing the instructions indicated by the entry point 210, which may be within a first function 220A ("FUNCTION_A" in FIG. 2B) of the executable program 110.

The emulator execution environment 115 may continue its analysis (e.g., serially) through the instructions of the first function 220A in a manner similar to that described herein with respect to FIGS. 1 and 2A. Namely, the emulator execution environment 115 may modify a first emulator state machine 250A associated with the first function 220A (including registers 260A and/or data store 265A of the first emulator state machine 250A) in response to the operations indicated by the instructions. Processing the instructions of the first function 220A may include replacing calls to APIs within the instructions with calls to emulated APIs of an emulator library of an emulator execution environment 115, as discussed herein with respect to FIG. 2A.

As part of processing the instructions of the first function 220A, the emulator execution environment 115 may detect a call 286 to a second function 220B of the executable program 110. To emulate the second function 220B, the emulator execution environment 115 may begin processing the instructions within the second function 220B ("FUNCTION_B" in FIG. 2B) of the executable program 110. The emulator execution environment 115 may continue its analysis (e.g., serially) through the instructions of the second function 220B in a manner similar to that described herein with respect to FIGS. 1 and 2A. In some embodiments, the emulator execution environment 115 may create a second emulator state machine 250B associated with the instructions of the second function 220B, though the embodiments of the present disclosure are not limited to such a configuration. The emulator execution environment 115 may modify the second emulator state machine 250B associated with the second function 220B (including registers 260B and data store 265B of the second emulator state machine 250B) in response to the operations indicated by the instructions of the second function 220B. Processing the instructions of the second function 220B may include replacing calls to APIs within the instructions with calls to emulated APIs of an emulator library of the emulator execution environment 115, as discussed herein with respect to FIG. 2A.

Though illustrated as separate first and second emulator state machines 250A, 250B, other configurations may be provided without deviating from the embodiments of the present disclosure. For example, in some embodiments an emulator state machine 250 may be shared by the first function 220A and the second function 220B. In some embodiments, a portion of an emulator state machine 250 may be shared by the first function 220A and the second function 220B while each of the first function 220A and the second function 220B also maintain separate first and second emulator state machines 250A, 250B.

The processing of the second function 220B may continue until it returns to the first function 220A (e.g., in response to the call 286). The emulator execution environment 115 may continue with the instruction codes 130 of the first function 220A until each of the instruction codes 130 has been analyzed and emulated.

Figure 3:
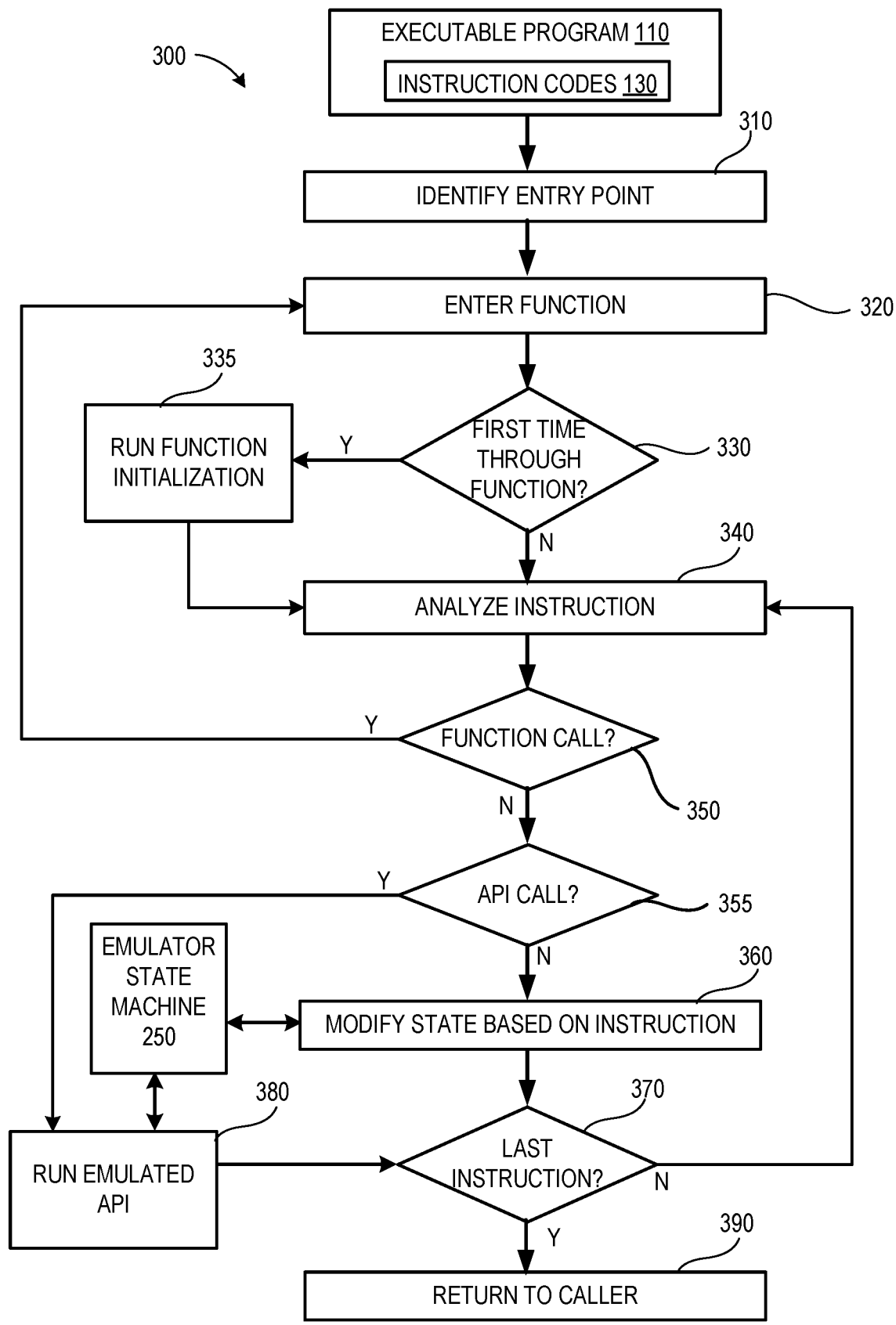
FIG. 3 is a flow diagram of a method of emulating instruction codes in an emulation execution environment, in accordance with some embodiments of the present disclosure.

FIG. 3 is a flow diagram of a method 300 of emulating instruction codes 130 in an emulation execution environment 115, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 120). The emulation execution environment in which the method 300 is operated may be similar to the emulation execution environment 115 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring simultaneously to the prior figures as well, the method 300 begins at block 310, in which an entry point of an executable program 110 is identified. The entry point may be one of a plurality of instruction codes 130 of the executable program 110. In some embodiments, the entry point may be within a function of the instruction codes 130 of the executable program 110.

At block 320, a function of the executable program 110 may be entered by the emulator (e.g., the emulation execution environment 115 of FIGS. 1 to 2B). The function may be an arrangement of instruction codes 130 within the executable program 110. In some embodiments, the function may be similar to function 220 discussed herein with respect to FIGS. 2A and 2B.

At block 330, it may be determined whether this is the first time this particular function has been called during the emulation of the executable program 110. If this is the first time this particular function has been called during emulation of the executable program 110 ('Y' in FIG. 3), the method 300 may continue to block 335, where a function initialization for the function may be emulated. The emulation of the function initialization may set up one or more local data structures within the emulation execution environment 115 (e.g., within emulation state machine 250 of FIGS. 2A and 2B) that are associated with the function. In some embodiments, the function initialization may only be executed the first time the function is emulated.

If this is not the first time this particular function has been called during emulation of the executable program 110, the method 300 may continue to block 340, in which an instruction of the function is analyzed. As described herein, the instruction may be one of the instruction codes 130 of the executable program 110. The emulation execution environment 115 may be configured to emulate the instruction in different ways, depending on what type of instruction it is.

At block 350, it may be determined whether the instruction is another function call (e.g., a call to an internal function of the executable program 110). If the instruction is another function call ('Y' in FIG. 3), the method 300 may proceed back to block 320 to process the function. If it is determined that the instruction is not a function call ('N' in FIG. 3), it may be determined whether the instruction is an API call at block 355. For example, the API call may be a call to an API that would be provided by an executable execution environment 117 (see FIG. 1).

At block 355, if it is determined that the instruction code is an API call ('Y' in FIG. 3), the method 300 may continue with operation 380 in which an emulated API is emulated rather than the API being called. The emulated API may be similar to emulated API 280 discussed herein with respect to FIG. 2A. In some embodiments, the emulated API 280 may perform similar, but not identical, operations with respect to the emulator state machine 250 as the API which is being emulated. In some embodiments, the emulated API 280 may be compiled for a different execution environment than the executable program 110. For example, in some embodiments, the executable program 110 may be JAVA-based, and the emulated API 280 may be PYTHON-based. In some embodiments, the running of the emulated API may modify an emulator state machine 250 of the emulation execution environment 115.

If, at block 355, it is determined that the instruction code is not an API call ('N' in FIG. 3), the method 300 may continue with operation 360 in which the emulator state machine 250 is modified based on the instruction. For example, the instruction code 130 being emulated may be intended to modify a memory location or a processing device register of a computing device, such as computing device 120 when executed. As part of the emulation of the instruction code 130, the emulator state machine 250 may be modified instead to emulate the operation of the instruction code 130. Thus, the emulator state machine 250 may be modified to emulate an execution state of the executable program 110 without actually executing the executable program 110.

At block 370, it may be determined if the last instruction of the function has been reached. If it determined that the last instruction of the function has not been reached ('N' in FIG. 3), control may continue to the next instruction at block 340. If it determined that the last instruction of the function has been reached ('Y' in FIG. 3), the function may return to its caller. If the function being examined is the entry point of the executable program 110, the return may, in some embodiments, end the emulation.

Referring back to FIG. 1, the emulator execution environment 115 may be capable of generating an execution profile 140 of the instruction codes 130 of the executable program 110 without actually executing the instruction codes 130. The execution profile 140 may include, for example, output of the emulator execution environment 115 that records the emulator state machine 250 of the emulator execution environment 115 at different times during the emulation of the executable program 110. For example, the emulator execution environment 115 may output to the execution profile 140 data associated with the instruction codes 130 that were emulated, the function and/or API calls (e.g., calls 272, 274, 276 of FIG. 2A and call 286 of FIG. 2B) that were made by the instruction codes 130, data that was passed to the emulated APIs (e.g., emulated APIs 280 of FIG. 2A), and the like. For example, if an emulated API 280 is provided to emulate an API that would return a string value, the emulated API 280 may include the string that was returned into the execution profile 140. In some embodiments, additional output may be provided to the execution profile 140 by the operation of the emulated APIs 280. For example, the emulation APIs 280 may include report operations 285 that output data associated with the operation of the emulated API to the emulator state machine 250 and/or the execution profile 140.

In some embodiments, the execution profile 140 may include, for example, output of the emulator execution environment 115 that records an order of the serial instructions that may be output as part of emulating the instruction codes 130 of the executable program 110. For example, as part of emulating the instruction codes 130 of the executable program 110, the emulator execution environment 115 may detect that the instruction codes 130 include one or more conditional or conditional jump statements, such as the jump statement 290 of FIG. 2A. A conditional jump statement may be a jump statement 290 that moves to a different part of the code (e.g., rather than executing serially) in response to a particular condition being met, such as in response to a comparison of a value in a register. An unconditional jump statement may be a jump statement 290 that moves to a different part of the code (e.g., rather than executing serially) regardless of a state of other variables.

As discussed with respect to FIGS. 2A and 2B, the emulator execution environment 115 may serially emulate the instruction codes 130 associated with the jump statement 290 a same or similar number of times as would be executed by the executable program 110 if it were executed in the executable execution environment 117. In some embodiments, the emulator execution environment 115 may output a record of each of the instruction codes 130 that is processed to the execution profile 140. As a result, instruction codes 130 of the executable program 110 that are encoded through the use of a jump statement 290 may be expanded for analysis.

Figure 4:
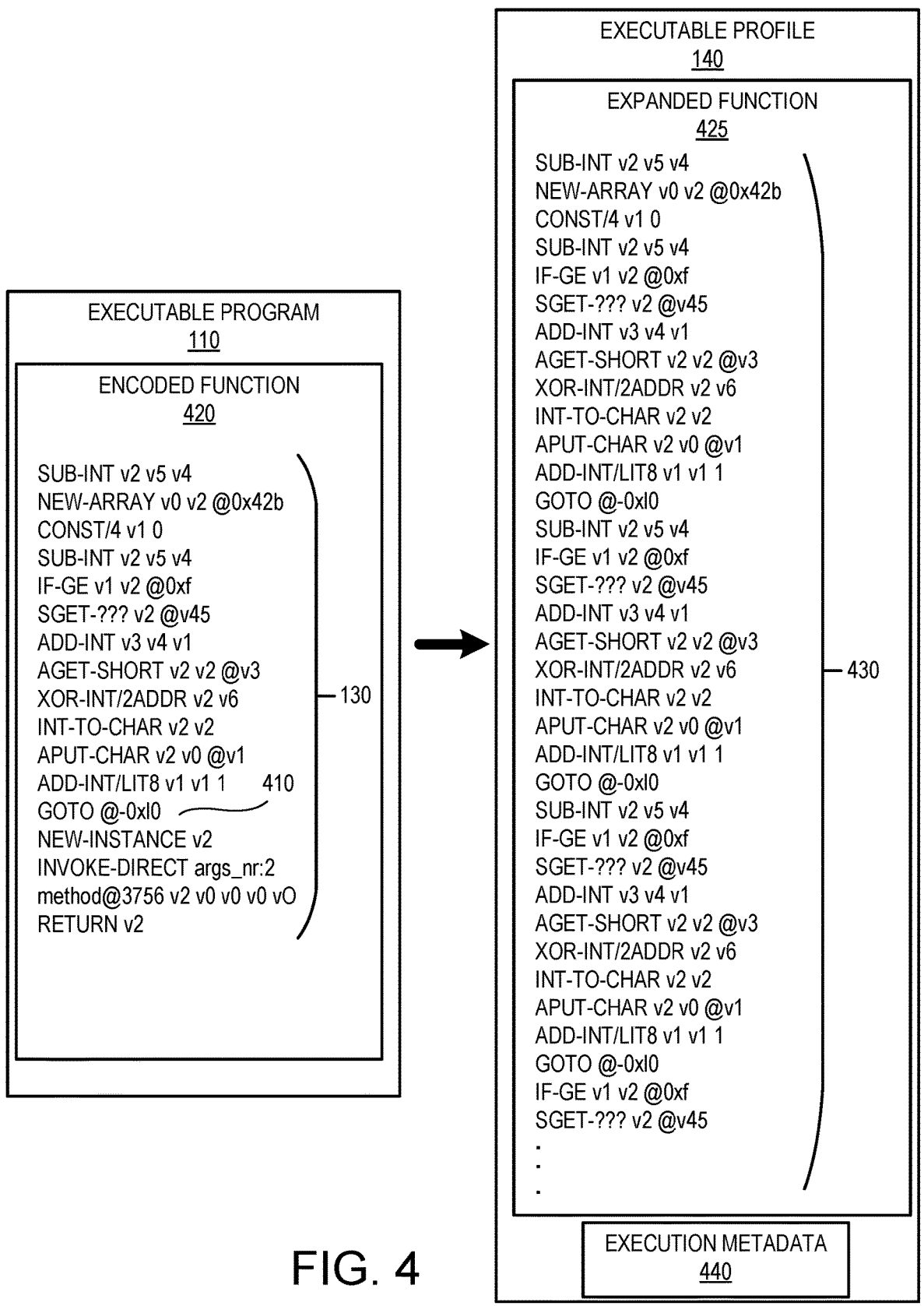
FIG. 4 is a schematic block diagram illustrating an expansion of an encoded function within an executable program, according to some embodiments of the present disclosure.

FIG. 4 is a schematic block diagram illustrating an expansion of an encoded function 420 within an executable program 110, according to some embodiments of the present disclosure. A description of elements of FIG. 4 that have been previously discussed will be omitted for brevity.

Referring to FIG. 4, the instruction codes 130 an encoded function 420 within the executable program 110 may include a jump statement 410. The jump statement 410 of the encoded function 420 may obfuscate the true number of times that the instruction codes 130 will be executed and/or an order of execution of the instruction codes 130. For example, in some embodiments, the jump statement 410 may be contingent on a state of a variable that may be set as a result of executing the executable program 110. As this variable may not be available within the executable program 110 itself, it may make an accurate execution profile of the executable program 110 difficult to determine from static analysis.

As a part of the emulation operations of the emulator execution environment 115, the flow of the jump statement 410 may be capable of being followed. In other words, the emulator execution environment 115 may emulate the operations of the instruction codes 130 of the encoded function 420 and may be capable of determining a state of the variables of the executable program 110 (e.g., through use of the emulator state machine 250 of FIG. 2A) so as to accurately emulate a number of times that the instruction codes 130 will execute and/or an order in which the instruction codes 130 will execute.

In some embodiments, the emulator execution environment 115 may output the instructions that are serially executed to the execution profile 140. For example, each time an instruction code 130 is executed, a copy of that instruction code 130 may be output as an instruction code 430 within an expanded function 425 included in the execution profile 140. In response to the jump statement 410 being encountered by the emulator execution environment 115, the emulation may continue by following the jump statement 410 and, for each of the instruction codes 130 that are serially processed while following the jump statement 410, a corresponding instruction code 430 may be output to the expanded function 425 of the execution profile 140.

In this way, the execution profile 140 may include an accurate listing of the instruction codes 430 that were encountered by the emulator execution environment 115 during emulation of the executable program 110. The expanded functions 425 containing the expanded set of instruction codes 430 may be more useful for analysis, as the expansion may deobfuscate the code of suspected malware.

In some embodiments, the execution profile 140 may also contain additional execution metadata 440 regarding the executable program 110 as determined by the emulator execution environment 115. For example, in some embodiments, the execution profile 140 may include execution metadata 440 related to a number of times particular functions and/or APIs within the executable program 110 are called, a number of times particular data (e.g., a particular variable and/or memory location) is accessed by the instruction codes 130 of the executable program 110, a number of times a particular loop is iterated, an order in which particular functions and/or APIs are called, and/or a type of encryption that may be used by the functions and/or APIs of the executable program 110, to name just of few non-limiting examples.

Referring back to FIG. 1, in some embodiments, a malware detection engine 150 may execute on the computing device 120. The malware detection engine 150 may be configured to detect a presence of malicious software (also referred to herein as "malware") on the computing device 120 (or associated with the computing device 120). Malware includes software and/or executing instructions that are designed to disrupt, damage, or gain unauthorized access to a computing device 120. Malware may be formatted as executable files (e.g., COM or EXE files), dynamic link libraries (DLLs), scripts, steganographic encodings within media files such as images, and/or other types of computer programs, or combinations thereof.

In some embodiments, the malware detection engine 150 may be configured to scan an executable such as executable program 110 to detect malware. The scan may involve an analysis of the contents of the executable program 110 to detect traces of malware. For example, the malware detection engine 150 may analyze the contents of the executable program 110 to identify known signatures of code or particular types of viruses that are known to the malware detection engine 150. An executable program 110 that is identified to contain malware may be isolated within the computing device 120 and, for example, be prevented from executing.

However, developers of malware are aware of some of the techniques used by malware scanning programs, such as the malware detection engine 150. In response, developers of malware have obfuscated the contents of their executable programs 110. For example, obfuscation may include inserting inoperable code within the executable instructions, compressing/encrypting the operating instructions, rearranging the instruction codes, and/or other techniques. Obfuscated code may be more difficult to process with the malware detection engine 150 because a signature of the malware may be removed or otherwise obscured by the obfuscation.

Embodiments of the present disclosure may generate the execution profile 140 from the executable program 110 using the emulator execution environment 115. The execution profile 140 may contain useful information regarding the structure and the operational characteristics of the executable program 110 obtained from the emulation that may allow for a more detailed scan by the malware detection engine than would be available from scanning the executable program 110 at rest (e.g., within storage 126). For example, the executable program 110 may include an expanded version of the instruction codes 430 and/or execution metadata 440 such as that described herein with respect to FIG. 4. The additional characteristics of the executable program 110 provided by the execution profile 140 may be useful in identifying markers that may be indicative of malware.

To take advantage of this improved technological functionality, some embodiments of the present disclosure may be configured to generate a machine learning (ML) model 165 based on one or more execution profile(s) 140 taken from one or more executable program(s) 110 generated by the emulator execution environment 115. The execution profiles 140 may be used by an ML training engine 160 to generate the ML model 165. The ML model 165 may then be used by the malware detection engine 150 to detect malware from an execution profile 140 associated with an executable program 110 instead of and/or in addition to scanning for malware signatures in the executable program 110.

In FIG. 1, though the malware detection engine 150, the ML training engine 160, and the emulator execution environment 115 are illustrated as separate components, this is only for the sake of simplicity of illustration. In some embodiments, one or more of the malware detection engine 150, the ML training engine 160, and/or the emulator execution environment 115 may be combined with other components. Similarly, though the malware detection engine 150, the ML training engine 160, and the emulator execution environment 115 are illustrated as separate from other components of the computing device 120 (e.g., from memory 124), this is only for ease of discussion. In some embodiments, one or more of the malware detection engine 150, the ML training engine 160, and/or the emulator execution environment 115 may be resident in memory 124 (e.g., as executable instruction codes).

Though the computing device 120 is illustrated as a single component in FIG. 1, embodiments of the present disclosure are not limited thereto. In some embodiments, one or more of the malware detection engine 150, the ML training engine 160, and the emulator execution environment 115 may exist and/or execute on different computing devices 120. For example, a first computing device 120 may be used to emulate executable programs 110 (e.g., utilizing emulator execution environment 115) to generate execution profiles 140, a second computing device 120 may be used to perform ML training (e.g., utilizing ML training engine 160) to generate the ML model 165, and a third computing device 120 may be used to detect malware (e.g., utilizing malware detection engine 150) based on the ML model 165.

In order to generate the ML model 165, multiple execution profiles 140 from multiple executable programs 110 may be gathered. The execution profiles 140 may be captured and/or obtained by the emulator execution environment 115 as described herein. Once the execution profiles 140 are obtained (e.g., using one or more of the techniques discussed herein with respect to FIGS. 2A to 4), the execution profiles 140 may be used to generate an ML model 165. For example, ML training engine 160 may analyze the execution profiles 140 to train the ML model 165, such as by using machine learning techniques. In some embodiments, characteristics of the execution profiles 140 may be extracted to use as input by the ML training engine 160. For example, the ML training engine 160 may form feature vectors from the execution profiles 140, which may be used as part of one or more machine learning techniques.

Figure 5:
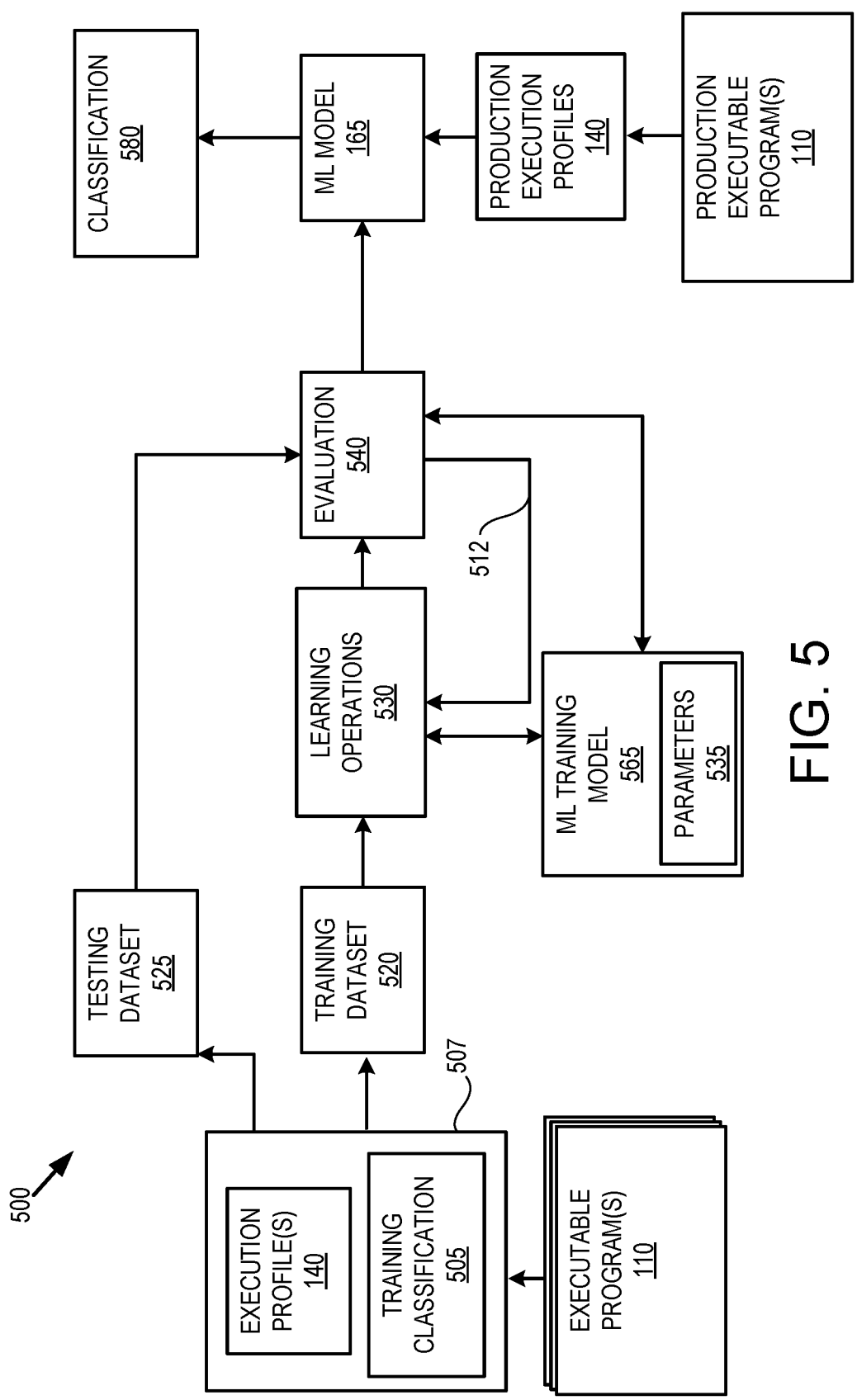
FIG. 5 is a block diagram illustrating a training system for performing a machine learning operation based on execution profiles, according to some embodiments of the present disclosure.

FIG. 5 is a block diagram illustrating a training system 500 for performing a machine learning operation based on execution profiles 140, according to some embodiments of the present disclosure. A description of elements of FIG. 5 that have been previously described will be omitted for brevity.

Referring to FIG. 5, a system 500 for performing a machine learning operation may include learning operations 530 which perform a feedback-controlled comparison between a training dataset 520 and a testing dataset 525 based on the execution profiles 140 associated with a plurality of executable programs 110.

For example, the execution profiles 140, generated from the executable programs 110 by an emulation execution environment, as described herein, may be combined with training classification data 505 to generate program-specific input data 507. For example, an execution profile 140 from a particular executable program 110 may be combined with training classification data 505 for the same executable program 110, where the training classification data 505 for the executable program 110 identifies whether the executable program 110 contains or is associated with malware. In some embodiments, as part of training an ML model 165, particular executable programs 110 with known classifications (e.g., it is known whether the executable program 110 contains or is associated with malware) may be collected and execution profiles 140 may be formed associated with each of the executable programs 110 with known classifications. The known classification of a given executable program 110 may be used as the training classification value 505 and combined with the execution profile 140 to form the program-specific input data 507 for that executable program 110.

For example, an execution profile 140 may be collected that is generated from an executable program 110 that is known to contain or be associated with malware. Thus, a training classification value 505 of the known-bad execution profile 140 may be generated indicating that the executable program 110 is associated with malware. An execution profile 140 may be combined with the training classification value 505 (e.g., malware) to generate the program-specific input data 507 for that executable program 110.

Similarly, an execution profile 140 may be collected that is generated from an executable program 110 that is known to be free of malware. Thus, a training classification value 505 of the known-good executable program 110 may be generated indicating that the executable program 110 is free of malware. An execution profile 140 may be combined with the training classification value 505 (e.g., malware-free) to generate the program-specific input data 507 for that executable program 110.

Though FIG. 5 illustrates that the execution profiles 140 are combined with the training classification data 505, the embodiments of the present disclosure are not limited to this configuration. In some embodiments, the execution profiles 140 may first be analyzed to generate a set of feature vectors. The feature vectors may represent individual metadata of the execution profile 140. In some cases, the feature vectors associated with the execution profiles 140 may be utilized to form the program-specific input data 507 for the machine learning operations 530.

In this way, program-specific input data 507 may be generated for each of a set of executable programs 110 used for training the ML model 165. The program-specific input data 507 may be separated into two groups: a training dataset 520 and a testing dataset 525. Each group of the training dataset 520 and the testing dataset 525 may include program-specific input data 507 (e.g., execution profiles 140 (or feature vectors representative thereof) and their associated training classification value 505) for a plurality of executable programs 110.

Learning operation 530 may be performed on the training dataset 520. The learning operations 530 may examine the data of the execution profiles 140 (or feature vectors representative thereof) to establish a relationship between the data of the execution profiles 140 that accurately predict the classification value 505 (e.g., malware or not malware) for a given executable programs 110. The learning operations 530 may generate a ML training model 565 that represents the determined relationship. The ML training model 565 may take data of an execution profile 140 as input, and output a classification value 505 (e.g., malware or non-malware) for the executable program 110 associated with the execution profile 140. The learning operations 530 may attempt to adjust parameters 535 of the ML training model 565 to generate a best-fit algorithm that describes a relationship between the execution profiles 140 and the classification value 505 for all of the executable programs 110 of the training dataset 520. A set of parameters 535 may be selected based on the training dataset 520 and preliminarily established as the ML training model 565.

The results of the learning operations 530 may be provided to an evaluation operation 540. The evaluation operation 540 may utilize the ML training model 565 generated by the learning operations 530 (based on the training dataset 520) to see if the ML training model 565 correctly predicts the training classification value 505 for the execution profile 140 for the executable programs 110 of the testing dataset 525. If the ML training model 565 accurately predicts the classification values 505 of the testing dataset 525, it may be promoted to the ML model 165. If the ML training model 565 does not accurately predict the classification value 505 of the testing dataset 525, feedback 512 may be provided to the learning operations 530, and the learning operations 530 may be repeated, with additional adjustment of the parameters 535. This process of learning operations 530 and evaluation operation 540 may be repeated until an acceptable ML model 165 is generated.

Once the ML model 165 is generated, it may be used to predict classifications 580 for production execution profiles 140. For example, for a given executable program 110, an execution profile 140 may be generated. The execution profile 140 may be generated, for example, using one or more of the methods described herein with respect to FIGS. 1 to 4. For example, an executable program 110 may be emulated by an emulation execution environment as described herein to generate the execution profile 140.

As illustrated in FIG. 5, the execution profile 140 may be provided as a production execution profile 140 to the ML model 165. The operations of the ML model 165 may generate the classification 580 (e.g., whether or not the executable program 110 associated with the production execution profile 140 contains and/or is associated with malware).

The training system 500 may use a number of different types of machine learning algorithms. For example, in some embodiments, the training system 500 may use a cross-validation-based machine learning platform. In some embodiments, the training system 500 may utilize a k-folds cross-validation, though the embodiments of the present disclosure are not limited thereto. It will be understood that other types of cross-validation, as well as other types of machine learning, such as a neural network, may be used without deviating from the embodiments of the present disclosure.

The system 500 of FIG. 5 provides an improvement in the technology associated with computer security. For example, the system 500 provides an improved malware detection platform that is able to adapt to changes in malware that may be detected by emulating the instructions of the malware (e.g., as part of the executable program 110) rather than executing them. The system 500 is an improvement over some techniques for malware detection in that they do not require the execution of the instructions to generate the execution profile 140, which reduces and/or eliminates an opportunity for the malware to infect the scanning environment. Instead, embodiments according to the present disclosure may identify malware based on characteristics detected by the emulation without requiring a hardened execution environment, while still bypassing obfuscation techniques that may make malware detection difficult.

Figure 6:
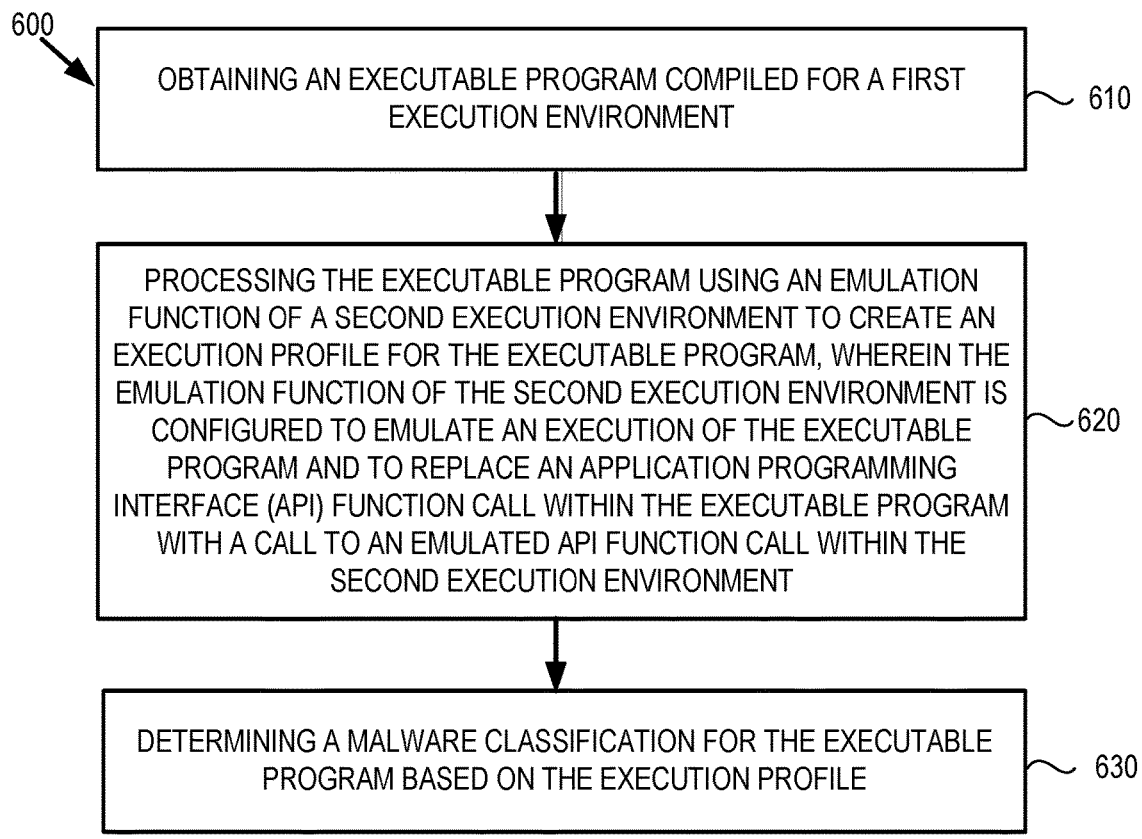
FIG. 6 is a flow diagram of a method of operating a malware detection system, according to some embodiments of the present disclosure.

FIG. 6 is a flow diagram of a method 600 of operating a malware detection system, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., computing device 120).

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring simultaneously to the prior figures as well, the method 600 begins at block 610, which includes obtaining an executable program compiled for a first execution environment. In some embodiments, the executable program may be similar to executable program 110 described herein. In some embodiments, the first execution environment may be similar to executable execution environment 117 described herein.

At block 620, the executable program may be processed by an emulation function of a second execution environment, different from the first execution environment, to create an execution profile for the executable program. In some embodiments, the second execution environment may be similar to emulation execution environment 115 described herein. In some embodiments, the execution profile may be similar to execution profile 140 described herein. The emulation function of the first execution environment may be configured to emulate an execution of the executable program and to replace an API function call within the executable program with a call to an emulated API function call within the second execution environment. In some embodiments, the replacement of the API function call may take place during the emulation of the executable program. In some embodiments, the emulated API function call may be similar to emulated API 280 described herein. In some embodiments, the first execution environment includes an execution environment based on a Java virtual machine (JVM), and the emulation function is based on a computing language other than Java.

In some embodiments, processing the executable program by the emulation function includes recording, as part of the execution profile, executable instructions serially processed by the emulation function through one or more conditional or unconditional jump statements within the executable program. In some embodiments, determining the malware classification is based at least in part on an analysis of the executable instructions.

In some embodiments, processing the executable program by the emulation function of the second execution environment includes providing a state machine associated with the executable program and initializing registers associated with the state machine, processing executable instructions of the executable program by accessing and modifying the registers associated with the state machine, calling the emulated API function call within the second execution environment instead of the API function call in the first execution environment, and continuing the processing of the executable instructions based on an output of the emulated API function call.

In some embodiments, processing the executable program by the emulation function of the second execution environment includes determining an initial call to an internal function of the executable program, emulating, by the emulation function, execution of an initialization function associated with the internal function, and, for subsequent calls to the internal function after the initial call, omitting, by the emulation function, an emulation of the execution of the initialization function.

In some embodiments, the execution profile includes execution metadata, and the execution metadata includes one or more of a number of times that internal functions and/or APIs within the executable program are called, an order in which the internal functions and/or the APIs are called, a number of times a first data element was accessed by instruction codes of the executable program 110, a number of times a jump statement within the executable program is executed, and/or a type of encryption used by the internal functions and/or the APIs of the executable program.

At block 630, a malware classification for the executable program may be determined based on the execution profile. In some embodiments, determining the malware classification for the executable program based on the execution profile includes providing training data including data associated with the execution profile and a classification value to a machine learning (ML) training model and training the ML training model based on the training data to generate an ML production model. The training may include computing model parameters that relate the data associated with the execution profile to the classification values of the training data.

Figure 7:
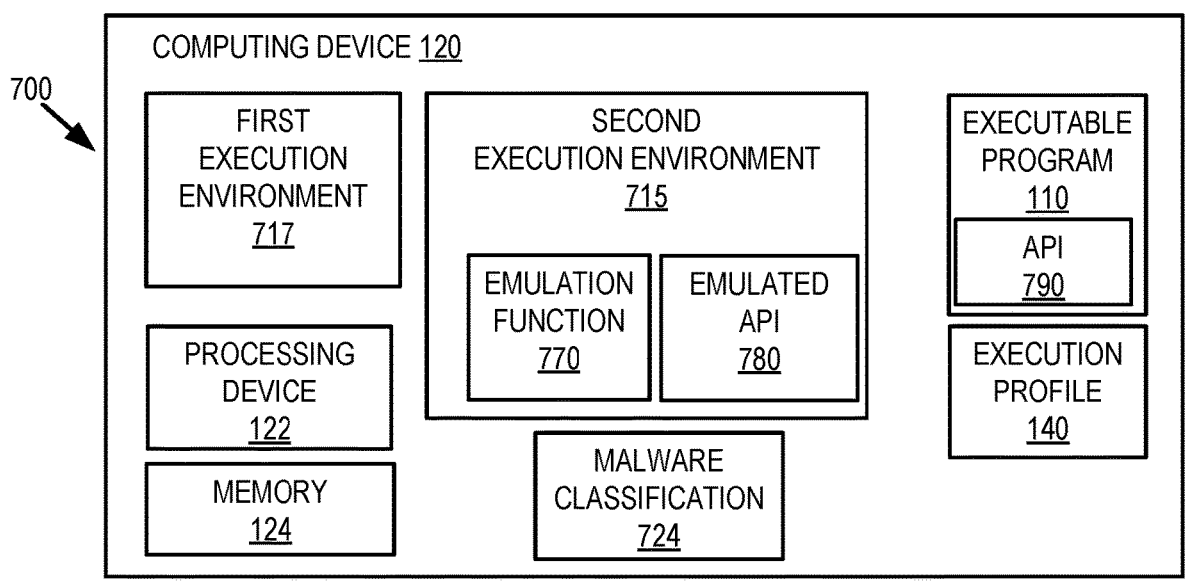
FIG. 7 is a component diagram of an example of a malware training and/or detection architecture, in accordance with embodiments of the disclosure.

FIG. 7 is a component diagram of an example of a malware training and/or detection architecture 700, in accordance with embodiments of the disclosure. The device architecture 700 includes computing device 120 having processing device 122 and memory 124, as described herein with respect to FIGS. 1 to 6.

An executable program 110 may be obtained that is compiled for a first execution environment 717. In some embodiments, the executable program 110 may be similar to executable program 110 described herein with respect to FIGS. 1 to 5. In some embodiments, the first execution environment 717 may be similar to executable execution environment 117 described herein with respect to FIGS. 1 to 5.

The computing device 120 (e.g., through operation of processing device 122) may process the executable program 110 by an emulation function 770 of a second execution environment 715, different from the first execution environment 717, to create an execution profile 140 for the executable program 110. In some embodiments, the second execution environment 715 may be similar to emulation execution environment 115 described herein. In some embodiments, the execution profile may be similar to execution profile 140 described herein with respect to FIGS. 1 to 5. The emulation function 770 of the second execution environment 715 may be configured to emulate execution of the executable program 110 and to replace an API function call 790 within the executable program 110 with a call to an emulated API function call 780 within the second execution environment 715. In some embodiments, the emulated API function call 780 may be similar to emulated API 280 described herein with respect to FIGS. 1 to 5. In some embodiments, the first execution environment 717 includes an execution environment based on a Java virtual machine (JVM), and the emulation function is based on a computing language other than Java. A malware classification 724 for the executable program 110 may be determined based on the execution profile 140.

The device architecture 700 of FIG. 7 provides an improved capability for malware detection. The device architecture 700 allows for detection of malware based on an execution profile 140 generated by an emulation operation instead of, or in addition to, malware detection based on signatures of executable files.

Figure 8:
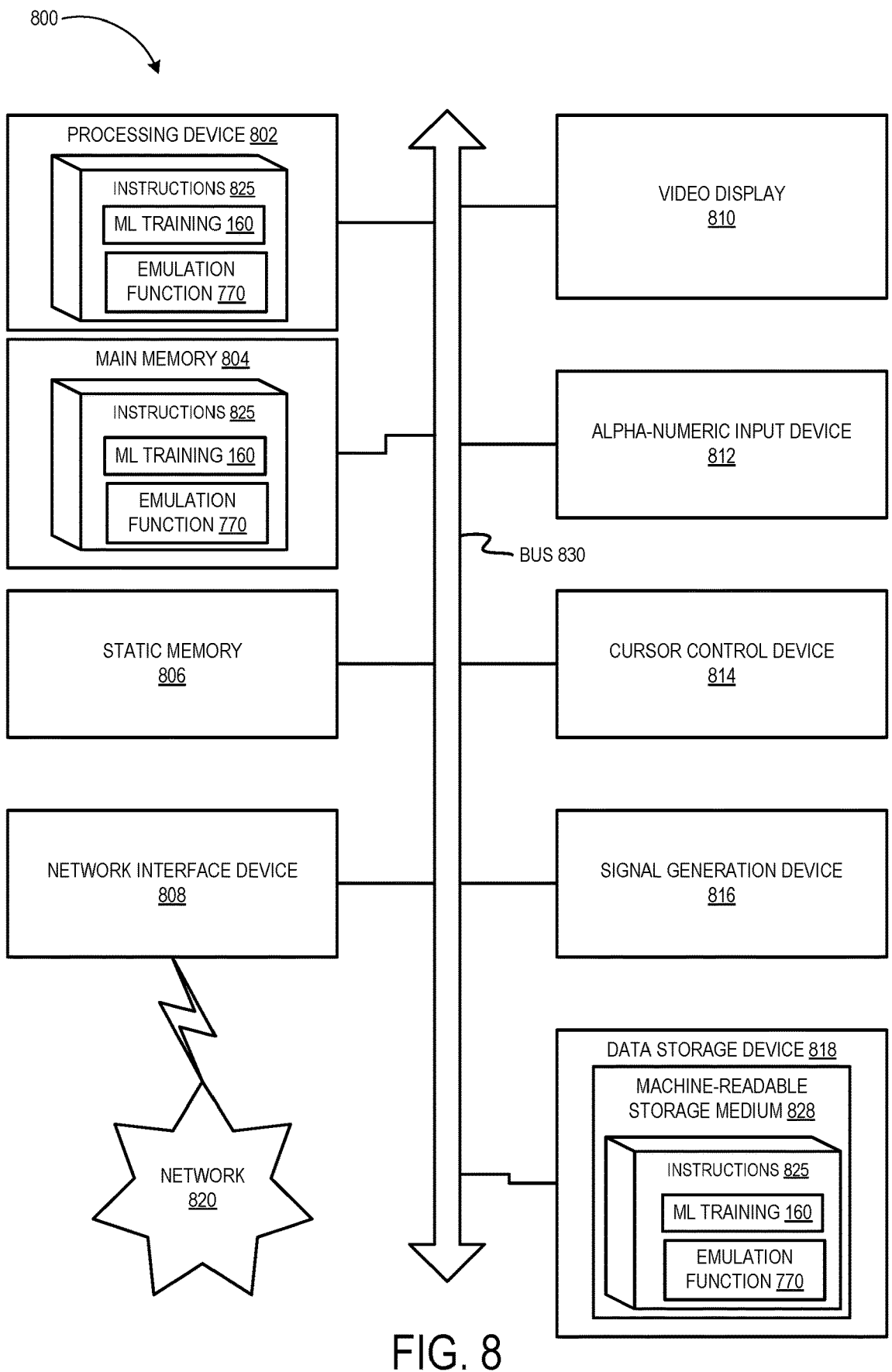
FIG. 8 is a block diagram of an example computing device that may perform one or more of the operations described herein, in accordance with embodiments of the disclosure.

FIG. 8 is a block diagram of an example computing device 800 that may perform one or more of the operations described herein, in accordance with some embodiments of the disclosure. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also include one or more special-purpose processing devices such as an application specific integrated circuit (ASIC), a field programmable gate array (FPGA), a digital signal processor (DSP), network processor, or the like. The processing device 802 may execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for an emulation function 770 (e.g., associated with an emulation execution environment 115 described herein) and/or an ML training engine 160 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "obtaining," "processing," "determining," "providing," "training," "calling," "continuing," "emulating," "omitting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure are not to be limited to the details given herein, but may be modified within the scope and equivalents of the appended claims.

What is claimed is:

1. A method comprising:
    obtaining an executable program compiled for a first execution environment;
    processing, by a processing device, the executable program using an emulation function of a second execution environment to create an execution profile for the executable program, wherein the emulation function of the second execution environment is configured to emulate an execution of the executable program and to replace an application programming interface (API) function call within the executable program with an emulated API function call that is called within the second execution environment, and wherein the processing further comprises recording, as part of the execution profile, a plurality of executable instructions serially processed by the emulation function through one or more conditional or unconditional jump statements within the executable program; and
    determining a malware classification for the executable program based on the execution profile and an analysis of the plurality of executable instructions.

2. The method of claim 1, wherein the first execution environment comprises an execution environment based on a Java virtual machine (JVM), and the emulation function is based on a computing language other than Java.

3. The method of claim 1, wherein determining the malware classification for the executable program based on the execution profile comprises:
providing training data comprising data associated with the execution profile and a classification value to a machine learning (ML) training model; and
training the ML training model based on the training data to generate an ML production model, the training comprising computing a plurality of model parameters that relate the data associated with the execution profile to the classification values of the training data.

4. The method of claim 1, wherein processing the executable program by the emulation function of the second execution environment comprises:
providing a state machine associated with the executable program and initializing registers associated with the state machine;
processing executable instructions of the executable program by accessing and modifying the registers associated with the state machine;
calling the emulated API function call within the second execution environment instead of the API function call in the first execution environment; and
continuing the processing of the executable instructions based on an output of the emulated API function call.

5. The method of claim 1, wherein processing the executable program by the emulation function of the second execution environment comprises:
determining an initial call to an internal function of the executable program;
emulating, by the emulation function, execution of an initialization function associated with the internal function; and
for subsequent calls to the internal function after the initial call, omitting, by the emulation function, an emulation of the execution of the initialization function.

6. The method of claim 1, wherein the execution profile comprises execution metadata, and
wherein the execution metadata comprises one or more of a number of times that internal functions and APIs within the executable program are called, an order in which the internal functions and the APIs are called, a number of times a first data element was accessed by instruction codes of the executable program, a number of times a jump statement within the executable program is executed, or a type of encryption used by the internal functions and the APIs of the executable program.

7. A system comprising:
a memory; and
a processing device, operatively coupled to the memory, to:
obtain an executable program compiled for a first execution environment;
process the executable program using an emulation function of a second execution environment to create an execution profile for the executable program, wherein the emulation function of the second execution environment is configured to emulate an execution of the executable program and to replace an application programming interface (API) function call within the executable program with an emulated API function call that is called within the second execution environment, the processing device further to record, as part of the execution profile, a plurality of executable instructions serially processed by the emulation function through one or more conditional or unconditional jump statements within the executable program; and
determine a malware classification for the executable program based on the execution profile an analysis of the plurality of executable instructions.

8. The system of claim 7, wherein the first execution environment comprises an execution environment based on a Java virtual machine (JVM), and the emulation function is based on a computing language other than Java.

9. The system of claim 7, wherein to determine the malware classification for the executable program based on the execution profile the processing device is to:
provide training data comprising data associated with the execution profile and a classification value to a machine learning (ML) training model; and
compute a plurality of model parameters that relate the data associated with the execution profile to the classification values of the training data to train the ML training model based on the training data to generate an ML production model.

10. The system of claim 7, wherein to process the executable program by the emulation function of the second execution environment the processing device is to:
provide a state machine associated with the executable program and initialize registers associated with the state machine;
access and modify the registers associated with the state machine to process executable instructions of the executable program;
call the emulated API function call within the second execution environment instead of the API function call in the first execution environment; and
continue to process the executable instructions based on an output of the emulated API function call.

11. The system of claim 7, wherein to process the executable program by the emulation function of the second execution environment the processing device is to:
determine an initial call to an internal function of the executable program;
emulate, by the emulation function, execution of an initialization function associated with the internal function; and
for subsequent calls to the internal function after the initial call, omit, by the emulation function, an emulation of the execution of the initialization function.

12. The system of claim 7, wherein the execution profile comprises execution metadata, and
wherein the execution metadata comprises one or more of a number of times that internal functions and APIs within the executable program are called, an order in which the internal functions and the APIs are called, a number of times a first data element was accessed by instruction codes of the executable program, a number of times a jump statement within the executable program is executed, or a type of encryption used by the internal functions and the APIs of the executable program.

13. A non-transitory computer-readable storage medium including instructions that, when executed by a processing device, cause the processing device to:
obtain an executable program compiled for a first execution environment;
process, by the processing device, the executable program using an emulation function of a second execution environment to create an execution profile for the executable program, wherein the emulation function of the second execution environment is configured to emulate an execution of the executable program and to replace an application programming interface (API) function call within the executable program with an emulated API function call that is called within the second execution environment, the processing device further to record, as part of the execution profile, a plurality of executable instructions serially processed by the emulation function through one or more conditional or unconditional jump statements within the executable program; and determine a malware classification for the executable program based on the execution profile an analysis of the plurality of executable instructions.

14. The non-transitory computer-readable storage medium of claim 13, wherein to determine the malware classification for the executable program based on the execution profile the processing device is to:

provide training data comprising data associated with the execution profile and a classification value to a machine learning (ML) training model; and compute a plurality of model parameters that relate the data associated with the execution profile to the classification values of the training data to train the ML training model based on the training data to generate an ML production model.

15. The non-transitory computer-readable storage medium of claim 13, wherein to process the executable program by the emulation function of the second execution environment the processing device is to:

provide a state machine associated with the executable program and initialize registers associated with the state machine;

access and modify the registers associated with the state machine to process executable instructions of the executable program;

call the emulated API function call within the second execution environment instead of the API function call in the first execution environment; and continue to process the executable instructions based on an output of the emulated API function call.

16. The non-transitory computer-readable storage medium of claim 13, wherein to process the executable program by the emulation function of the second execution environment the processing device is to:

determine an initial call to an internal function of the executable program;

emulate, by the emulation function, execution of an initialization function associated with the internal function; and for subsequent calls to the internal function after the initial call, omit, by the emulation function, an emulation of the execution of the initialization function.

17. The non-transitory computer-readable storage medium of claim 13, wherein the execution profile comprises execution metadata, and wherein the execution metadata comprises one or more of a number of times that internal functions and APIs within the executable program are called, an order in which the internal functions and the APIs are called, a number of times a first data element was accessed by instruction codes of the executable program, a number of times a jump statement within the executable program is executed, or a type of encryption used by the internal functions and the APIs of the executable program.

* * * * *